United States Patent [19]
Meelu et al.

[11] Patent Number: 5,547,770
[45] Date of Patent: Aug. 20, 1996

[54] MULTIPLEX ALUMINIDE-SILICIDE COATING

[75] Inventors: Mehar C. Meelu, Birmingham; Alan T. Jones, Derby, both of Great Britain; Bruce G. McMordie, Perkasie, Pa.

[73] Assignees: Sermatech International, Inc., Limerick, Pa.; Rolls Royce plc., London, England; a part interest

[21] Appl. No.: 185,923
[22] PCT Filed: May 18, 1993
[86] PCT No.: PCT/US93/04507
 § 371 Date: Jul. 6, 1994
 § 102(e) Date: Jul. 6, 1994
[87] PCT Pub. No.: WO93/23247
 PCT Pub. Date: Nov. 25, 1993

[30] Foreign Application Priority Data

May 19, 1992 [GB] United Kingdom ............. 9210683

[51] Int. Cl.$^6$ ............. B32B 15/01; C23C 16/00
[52] U.S. Cl. ............. 428/678; 428/635; 428/650; 428/651; 428/680; 427/252; 427/376.8; 427/399; 427/419.7
[58] Field of Search ............. 428/610, 614, 428/660, 667, 680, 651, 941, 650, 652, 653, 615, 469, 472, 635, 678; 427/252, 253, 376.7, 376.8, 399, 419.7

[56] References Cited

U.S. PATENT DOCUMENTS

| | | | |
|---|---|---|---|
| 3,656,919 | 4/1972 | Lucas et al. | 428/651 |
| 3,753,668 | 8/1973 | Flicker | 428/641 |
| 3,779,719 | 12/1973 | Clark et al. | 428/652 |
| 3,819,338 | 6/1974 | Bungardt et al. | 428/652 |
| 4,310,574 | 1/1982 | Deadmore et al. | 427/405 |
| 4,349,581 | 9/1982 | Asano et al. | 427/34 |
| 4,374,183 | 2/1983 | Deadmore | 428/641 |
| 4,933,239 | 6/1990 | Olson et al. | 428/557 |

Primary Examiner—Ellis P. Robinson
Assistant Examiner—Leonidas J. Jones, III
Attorney, Agent, or Firm—Weiser & Associates

[57] ABSTRACT

A silicon-enriched aluminide coating for a superalloy article has a composite microstructure including a plurality of bands of silicon rich phases ($S_1$, $S_2$, $S_3$) and a plurality of bands of aluminum rich phases ($A_1$, $A_2$, $A_3$), these bands being spaced apart through the thickness of the coating. The composite microstructure is created by depositing a slurry containing both silicon and aluminum in elemental or pre-alloyed form on the article and heating the coated article above the melting temperature of aluminum to cure the coating, the depositing and curing steps being repeated at least once before diffusion heat treating the resulting layers. Thereupon, all the above process steps are repeated at least once.

49 Claims, 10 Drawing Sheets

MULTIPLEX ALUMINIDE-SILICIDE COATING

TECHNICAL FIELD

This invention relates to aluminide coatings for aluminizing of heat resistant alloy substrates and a process for applying such coatings, more specifically to composite coatings containing aluminium-rich and silicon-rich phases to improve their resistance to hot corrosion and oxidation.

During operation, components in the turbine section of a gas turbine are exposed to combustion gas temperatures that can reach 1200° C. (2200° F.). These components are typically made of nickel and cobalt base superalloys specially formulated for strength at these temperatures. However, upon exposure to oxygen in the combustion gases at such high temperatures, these heat resistant materials begin to revert to their natural metal oxide form. The nickel and cobalt oxide scales that form on the surfaces of these alloys are not tightly adherent. During thermal cycling, they crack and fall off the surface exposing more unreacted substrate to the environment. In this manner, oxidation roughens and eventually consumes unprotected parts made of these alloys, see FIG. 1. Adding sodium and contaminants containing chlorine and sulphur to the combustion gases speeds degradation. Above about 540° C. (1004° F.), sodium and sulphur react to form low melting point sulphate salts which not only dissolve the oxide films on nickel and cobalt, but also can directly attack the substrates, see FIG. 2.

BACKGROUND ART

One solution to the hot corrosion and oxidation problem which is widely applied in gas turbine engines, is to alloy aluminium into the surface of a superalloy component, a process known as aluminizing. Aluminium forms stable intermetallic compounds with both nickel and cobalt. The oxide layer which forms on these compounds at high temperature is no longer a metal oxide of nickel or cobalt, but rather a tough, tightly adherent, protective layer of alumina, $Al_2O_3$ (FIG. 3).

A variety of commercial coatings are based upon this protection scheme. Sometimes aluminium is deposited from a vapour phase in a process that has come to be known as pack aluminizing. In pack aluminizing, aluminium powder is reacted with halide activators to form gaseous compounds which condense on the metal surface and react producing aluminium metal. The aluminium atoms diffuse into the substrate, reacting to produce intermetallic aluminides. This process has been described in detail in a number of patents, including U.S. Pat. No. 3,257,230 (Wochtell et al).

State-of-the-art MCrAlY overlay coatings also rely upon alumina films for their hot corrosion resistance. Owing to the presence of chromium and yttrium in the film, aluminium contents in these coatings do not need to be as high as in pack aluminides; however, protection is still derived from a tightly adherent scale of alumina.

Slurry aluminizing is another alternative method of providing a protective, alumina forming intermetallic aluminide coating on a superalloy. In the slurry process, an aluminium-filled slurry coating is first deposited on the hardware. When the coated part is heated in a protective atmosphere, aluminium in the film melts and reacts with the substrate to form the desired intermetallic phases.

The demonstrable resistance of aluminide coatings to hot corrosion and oxidation is due to the thermodynamic stability of the alumina scale that forms on them. However, they do have some susceptibility to "low temperature" hot corrosion attack at about 700°–800° C. by alkali metal oxides (e.g. $Na_2O$) and acidic oxides of refractory metals (e.g. $MoO_3$ and $W_2O_3$).

Silicon dioxide ($SiO_2$) is another very stable oxide. Like aluminium, silicon forms stable intermetallic compounds (silicides) with nickel and cobalt as well as chromium and other elements typically found in refractory alloys, such as molybdenum, tungsten and titanium. This reduces the segregation of these elements into the outer surface protective oxide layer, thus improving its protectiveness. Furthermore, unlike aluminium, silicon is unable to form sulphides and is resistant to sulphur diffusion. Consequently, silicide coatings, produced by pack or slurry processes, have been used on refractory alloys to improve resistance to hot corrosion and oxidation. Silicides have proven particularly useful in resisting sulphurous attack at "low" temperatures (700°–800° C.). The benefits of silicon-based coatings have been described by many, including F. Fitzer and J. Schlicting in their paper "Coatings Containing Chromium, Aluminium and Silicon for High Temperature Alloys", given at a meeting of the National Association of Corrosion Engineers held Mar. 2–6, 1981 in San Diego, Calif., and published by them as pages 604–614 of "High Temperature Corrosion", (Ed. Robert A. Rapp). This paper is included herein by reference.

The benefits of aluminizing and siliconizing are combined in processes which simultaneously deposit both aluminium and silicon on a metal surface, usually that of a superalloy. One such process, described in U.S. Pat. No. 4,310,574 (Deadmore et al), deposits a silicon-filled organic slurry on a surface, then aluminizes the surface by a conventional pack aluminizing. Aluminium carries silicon from the slurry with it as it diffuses into the superalloy from the pack mixture. Deadmore et al ('574) demonstrates that the resultant silicon-enriched aluminide has better resistance to oxidation at 1093° C. than did aluminides without silicon.

Another means to produce so-called "silicon-modified" or "silicon-enriched" aluminides is to apply a slurry containing elemental aluminium and silicon metal powders to an alloy substrate containing aluminide and silicide forming elements and then heat it above 760° C. (1500° F.). As the aluminium and silicon in the slurry melt, they react with the substrate elements and diffuse preferentially. The aluminium alloys with nickel or cobalt in the substrate while silicon alloys with chromium or other silicide formers. The end result is a composite aluminide-silicide coating. This process is often termed a silicon modified slurry aluminide process and is commercially utilised under the trade name, "SermaLoy J".

In test, this silicon-modified aluminide coating proved uniquely resistant to sulphidation attack over a wide range of operational temperatures. Details of some testing has been published by American Society of Mechanical Engineers (ASME) in a paper by F N Davis and C E Grinell entitled "Engine Experience of Turbine Materials and Coatings (1982) which is incorporated herein by reference. This coating is now specified on many industrial and marine turbines.

Experience suggests the silicide phases are key to the enhanced corrosion resistance of this aluminide-silicide coating, because they displace some of the vulnerable aluminide phases from the surface layer. Unfortunately, particularly when utilised on superalloys, these critical silicide phases become excessively concentrated in the outer third of the coating microstructure after a typical coating and diffusion treatment. Silicon content of the outer surface can be as high as about 14–17 wt. %, as opposed to 8 wt. % in the bulk of the coating. This seems to render the outer part of the coating prone to cracking after long service. Crack propagation is rapid after crack initiation, even though the threshold for initiation is high. Although the cracks are not very serious, in that they do not propagate into the superalloy substrate, it would be preferable to prevent their occurrence or restrict their penetration through the coating, since they eventually open up corrosion paths to the substrate.

SUMMARY OF THE INVENTION

An object of the invention is to reduce the amount of segregation of silicon content into the surface of silicon modified aluminide coatings, thereby reducing the tendency of the coatings to develop cracks during service, while at the same time maintaining good resistance to hot corrosion.

A further object of the invention is to create an aluminide-Silicide coating possessing internal barriers to the diffusion of metallic species through the coating, thereby reducing the amount of differential diffusion of the aluminium and silicon species and hence reducing the silicon content of the coating surface.

Another object is to create an aluminide-silicide coating with a low rate of hot corrosion after breach of the coating surface during service.

Accordingly, the present invention provides a process for producing an aluminide-silicide coating on a suitable superalloy substrate, comprising the steps of applying to the superalloy substrate at least one layer of a coating material comprising aluminium and silicon, diffusion heat treating the at least one layer, and repeating the above application and diffusion steps at least once more.

Superalloy substrates suited to this form of coating contain aluminide and silicide forming metallic elements as major constituents and comprise nickel-based and cobalt-based superalloys.

Preferably, the temperature of the diffusion heat treatment is chosen such that it does not conflict with the heat treatment required to achieve desired microstructural and mechanical characteristics of the superalloy substrate.

It is found as a result of the above process that elements corresponding to the constituent elements of the alloy substrate are present throughout the extent of the coating but are combined differentially with the aluminium and silicon constituents of the coating such that a plurality of spaced apart bands with enhanced silicon content relative to neighbouring regions of the coating are formed within the thickness of the coating.

Hence, with respect to coating structure, the present invention provides, on suitable superalloy substrates, a multiplex aluminide coating having at least two bands with enhanced silicon content, the bands being spaced apart from each other depthwise in the coating.

Avoidance of excessive concentrations of silicon rich phases in the outer surface of the coating is facilitated in accordance with the invention by preferably repeating the coating application and diffusion process steps twice. It was found that experiments utilising this process to produce coatings on particular nickel based and cobalt based superalloys produced aluminide coatings having two or three bands with enhanced silicon content, the bands differing from each other with respect to silicon content. If two such bands were produced, the outermost band was located within the coating at a substantial distance from its outer surface. If three such bands were produced, the outermost band was also the band exhibiting the least silicon content.

In general, the coating structure can be said to include a plurality of band having different compositions with respect to their aluminide and silicide contents, there being at least two bands whose silicide contents are greater than immediately adjacent regions of the coating, one of the at least two bands having a greatest silicide content, the band with the greatest silicide content being spaced away from the outer surface of the coating.

In coatings according to the invention, it is preferred that the silicon content in or near the surface of the coating does not exceed 10 wt.%, and most preferably it should not exceed 8 wt.%.

In more detail, a process for producing an aluminide-silicide coating on a superalloy article containing aluminide and silicide forming metallic elements as major constituents, comprises the steps of depositing a coat of relatively low viscosity slurry coating material on the article, the coating material comprising silicon and aluminium in powder form and a curable binder liquid, heating the coated article to a temperature which is well below the melting temperature of aluminium but which is sufficient to cure the coating in a reasonable time, e.g. 300°–600° C., repeating the depositing and heating steps, and diffusion heat treating the coated article in a protective inert atmosphere at a temperature above the melting point of aluminium, e.g. a temperature in the range 750°–1120° C., for a time sufficient to diffuse aluminium and silicon from the coating material into the alloy article and at least chromium and nickel from the alloy article into the coating material. Thereupon, all the preceding process steps are repeated at least once, but preferably after first cleaning any undiffused residues from the coating surface, to produce a finished coating having a plurality of bands of silicon rich phases and a plurality of bands of aluminium rich phases, the bands being spaced apart through the thickness of the finished coating.

Alternatively, the invention envisions a process comprising the steps of applying a more viscous slurry containing aluminium and silicon in powder form to the alloy substrate to obtain a thicker initial coat, curing the slurry to affix the metal powders to the substrate and then diffusion heat treating in a protective atmosphere to alloy the aluminium and silicon with the substrate. After the diffusion is complete, undiffused residues are again preferably removed (e.g., by abrasive blasting or chemical cleaning), then slurry is again applied, cured and diffused at least once more.

The slurry of this invention requires a binder liquid containing the aluminium and silicon in powder form. Aluminium and silicon may be present in elemental or prealloyed form. The binder is selected to cure to a solid matrix which holds the metal pigments in contact with the metal surface during heating to the diffusion temperature. It is also selected to be fugitive during diffusion to yield residues that are only loosely adherent to the surface after diffusion has been completed.

The binder component of the slurry of this invention may be an organic type (such as nitrocellulose) or one of the class of inorganic chromate, phosphate, molybdate or tungstate solutions described in U.S. Pat. Nos. 4,537,632 and 4,606,967 (assigned to Sermatech International), which are hereby incorporated by reference.

The binder may also be one of the class of water-soluble silicates, which cure to tightly adherent glassy solids by loss of chemically bound water.

Total solid content of the above slurry includes between 2 and 40 wt. % silicon, preferably between 5 and 20 wt. %, most preferably between 10 and 15 wt. %.

The above multi-diffusion technique locks much of the coating's population of silicide phases at intervals within the coating, resulting in a lower concentration of silicide phases at the outer surface and overall a more even distribution throughout the coating, thus making the coating less prone to cracking.

Also, the depthwise spaced apart silicide concentrations within the coating enhance long term corrosion resistance by providing barriers to further penetration when the topmost layer has been eroded or corroded away during service.

Note that different superalloys require different heat treatment regimes due to their different metallurgical characteristics and the mechanical properties it is desired they should have in service. Consequently, the temperature and time at the temperature chosen for diffusion heat treatment of a superalloy article coated in accordance with the invention is conveniently chosen to fit the heat treatment regime required by the particular superalloy and the duty required of the article.

The theory behind this invention is believed to be as follows.

Diffusion heat treatment of an aluminium-silicon slurry coated superalloy substrate in an inert atmosphere or vacuum causes certain elements from the substrate and the coating, which have a particular affinity for each other, to diffuse towards and combine with each other. Rates of diffusion vary from element to element and increase with temperature.

At the chosen diffusion heat treatment temperature, aluminium from the coating and nickel and/or cobalt from the superalloy substrate move rapidly towards each other and combine to form nickel aluminides. Similarly, silicon in the coating has an affinity with the substrate metal chromium, and with molybdenum, tantalum and titanium, if present, and therefore combines with one or more of these to form their silicides.

However, silicon moves through the coating towards the substrate appreciably more slowly than the aluminium and therefore the outer parts of the coating become relatively enriched with silicon. Because, generally speaking, chromium is present in superalloys in much larger amounts than the other elements for which silicon has an affinity, this silicon mostly combines with chromium during the diffusion treatment to produce an outer zone with a high chromium silicide content.

Application now of a second slurry coat with a diffusion step, in accordance with the invention, results in reduced mobilities of the atoms during diffusion treatment of the second coat, as a barrier to their passage across the interface between the successive coats has been produced by the earlier diffusion treatment. Hence the driving forces for nickel/cobalt and aluminium on the one hand and chromium and silicon on the other hand are altered from what they were during the the first diffusion treatment, resulting in a different chemistry of the coating in the second diffusion treated coat. Of course, further diffusion treated coats applied subsequent to the second coat will have more than one barrier to diffusion to and from the substrate and therefore even greater differences in chemistry compared with previously known aluminide-silicide coatings. In particular, concentration of silicon rich phases on or near the surface of the finished coating is reduced.

BRIEF DESCRIPTION OF THE DRAWINGS

Exemplary details of the invention and its background are illustrated with reference to the accompanying drawings, in which.

Figure 1:
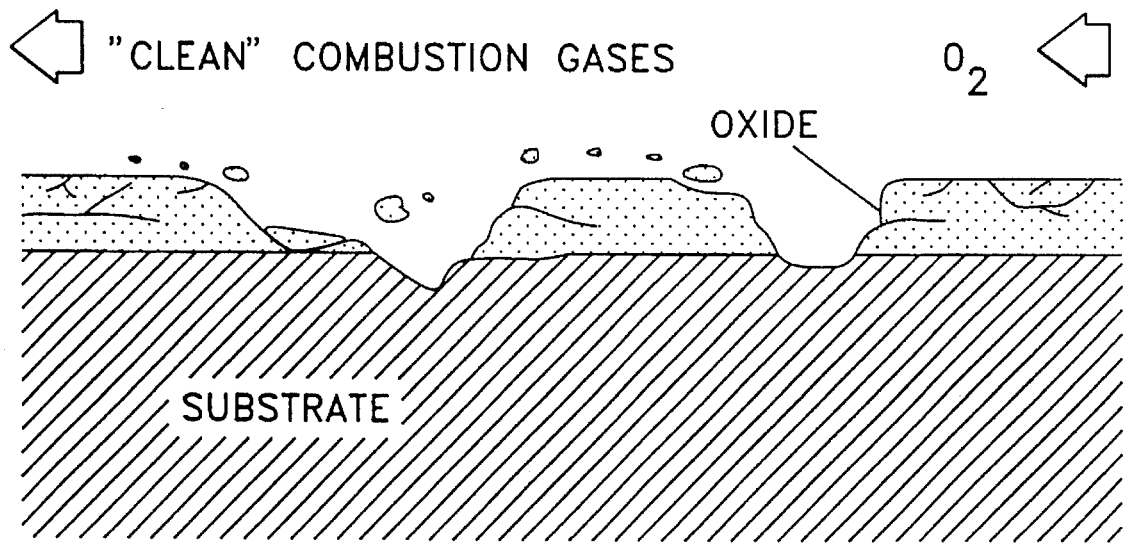
FIG. 1 relates to the already mentioned process of oxidation and erosion which takes place on unprotected nickel and cobalt superalloy surfaces of gas turbine components during exposure to oxygen in high temperature combustion gases.
Figure 2:
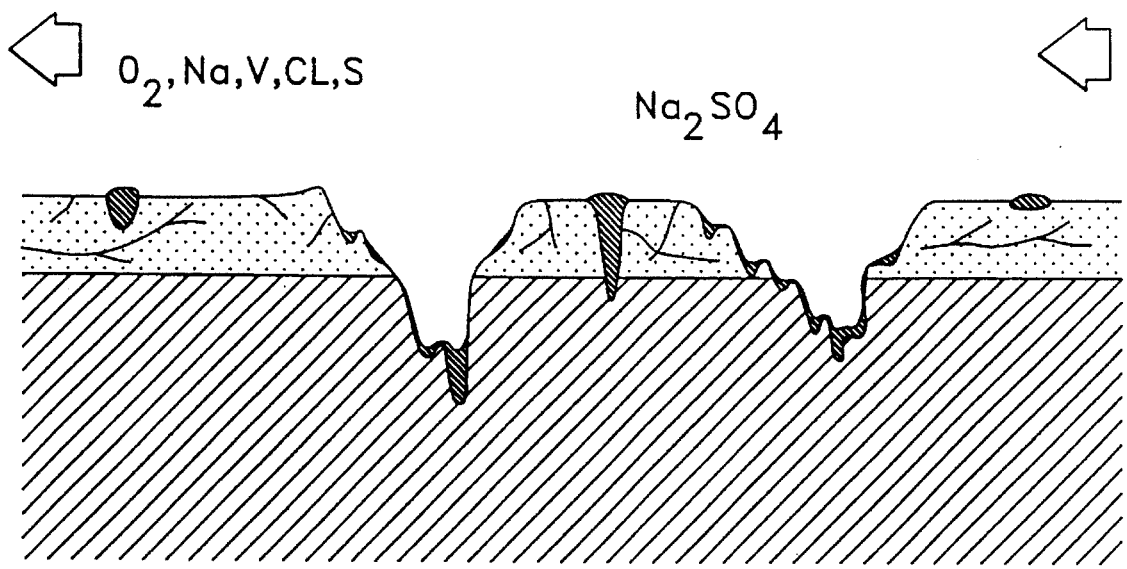
FIG. 2 relates to the already mentioned process of enhanced corrosion of unprotected superalloy surfaces when the combustion gases also contain the type of contaminants usually found in marine environments.
Figure 3:
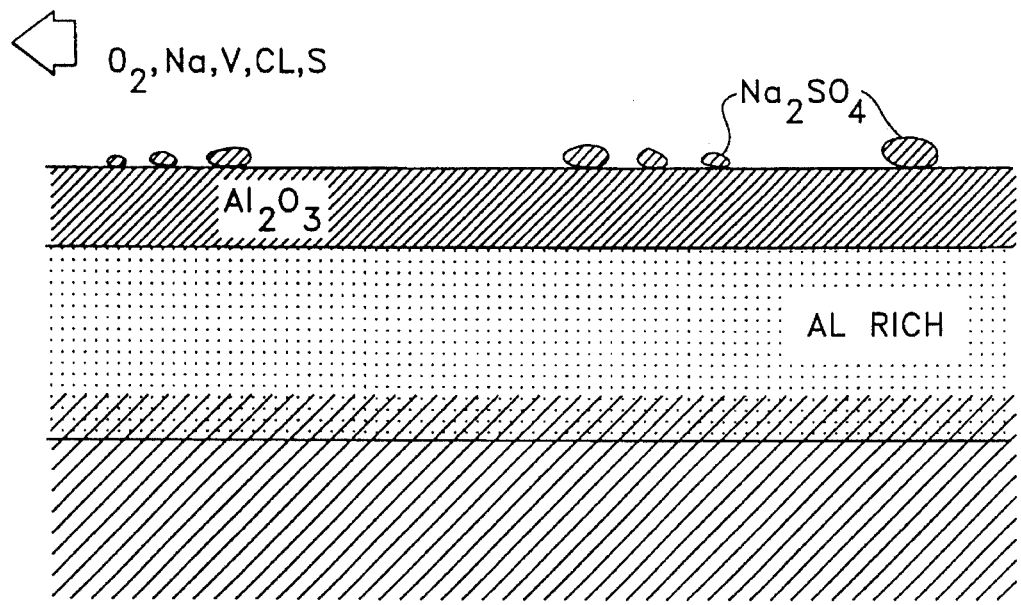
FIG. 3 relates to the already mentioned prior art type of aluminide coating which it is desired to improve but which is nevertheless effective in protecting superalloy surfaces from the worst effects of contaminated combustion gases.
Figure 11:
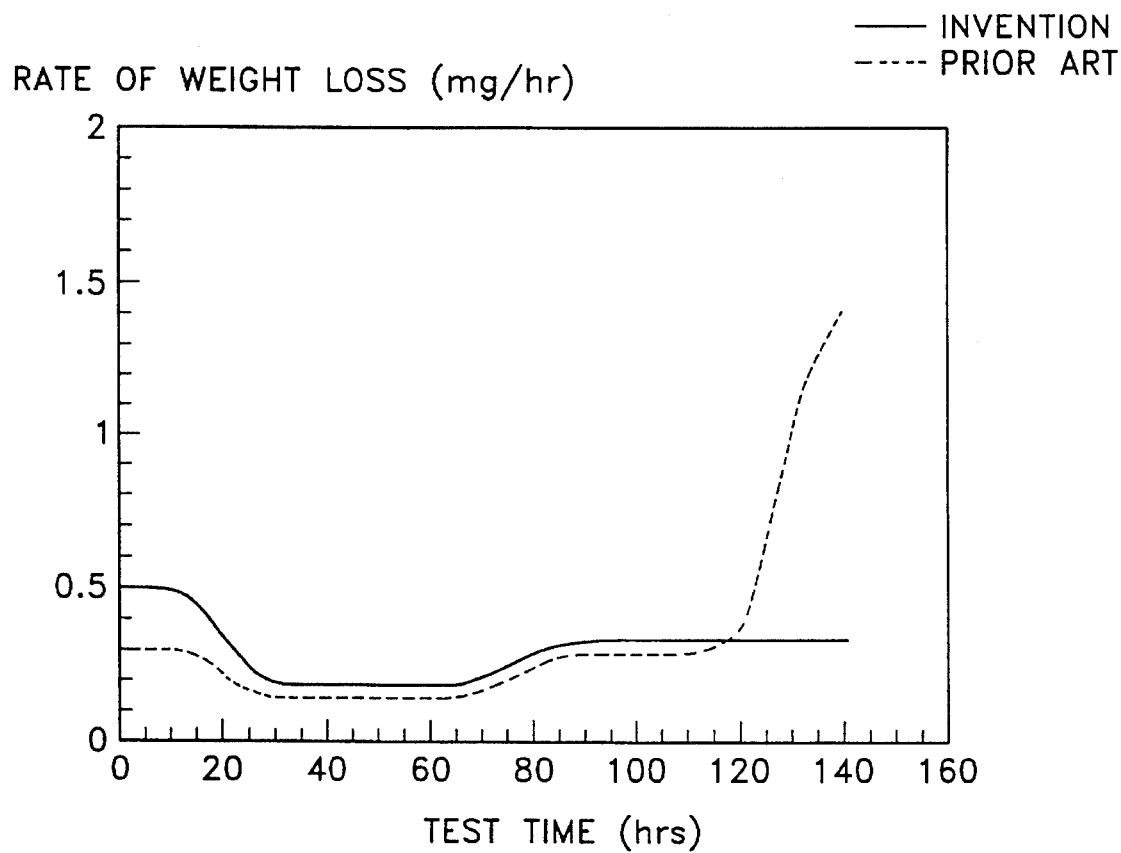
FIG. 11 is a graph showing the result of accelerated hot corrosion testing of a test piece coated with a standard aluminide-silicide coating and another test piece coated in accordance with the present invention, with rate of weight loss in milligrammes per hour plotted against time of test in hours.

EXAMPLES OF THE INVENTION AND COMPARISONS WITH PRIOR ART (A) COATINGS ON NICKEL BASED SUPERALLOY SUBSTRATE

The method of the invention was applied to produce protective coatings on two different types of test samples.

These were:

(i) Turbine blades of an SMIA unit manufactured by Rolls-Royce Industrial Marine Gas Turbines Ltd of Ansty, Coventry, UK. These blades were made of IN738 nickel base superalloy material.

(ii) Pins (6.5 mm diameter and 65 mm long), also made from IN738 material. These were used to rig test the coating's susceptibility to hot corrosion.

The approximate specification of IN 738 in wt. % by constituents is as follows:

60 Ni, 16 Cr, 8.5 Co, 3.45 Ti, 3.45 Al, 2.6 W, 1.7 Mo, 1.7 Ta, 0.8 Nb, 0.5 Fe, 0.5 Si, 0.2 Mn, 0.17 C, 0.1 Zr, 0.01 B

The samples were degreased in hot vapour of 1,1,1 trichloroethane, then blasted with alumina grit to prepare the surfaces for coating. $^{90}/_{120}$ mesh grit was used for blasting the alloy pins and 320 mesh grit for the turbine blades. Grit blasting was done in a pressure cabinet at a pressure of 20 psi or 138 kPa. A thin wet coat of a slurry of aluminium and silicon powder in an aqueous acidic chromate/phosphate solution was applied to the blasted samples using a conventional air atomising spray gun.

This slurry was about 60 wt. % solids, with silicon comprising about 10 wt. % of total solids. The slurry comprised elemental aluminium and silicon particles suspended in an aqueous solution of chromates and phosphates. The sprayed slurry coat was dried at 80° C. (175° F.) for at least 15 minutes, then cured for 30 minutes at 350° C. (660° F.).

It would be possible to cure at higher temperatures, say up to 600° C., to accelerate the curing process, provided the temperature chosen is comfortably below the melting point of aluminium. It would also be possible to cure at lower temperatures, consistent with achieving curing within a reasonable time.

When the samples had cooled, the coating thickness was built up by applying a second wet slurry coat and curing it on the samples. The coated blades were heated in argon to 870° C. (1600° F.) and held for 2 hours to diffuse the aluminium and silicon into the sample, and also allow elements from the substrate to diffuse through the coating. A diffusion temperature range of 870°–885° C. was specified for this investigation and was chosen to minimise the effect on the properties of the substrate material. However, this temperature range is not essential to the working of invention, and could be varied within the range, e.g., 650°–1120° C., according to the composition of the substrate and coating materials and their desired properties after diffusion. In any case, the temperature range chosen should also be sufficiently above the melting point of aluminium to achieve reasonable processing times.

After diffusion, undiffused residues were removed from the samples by blasting with the 320 grit alumina abrasive at 50 psi or 345 kPa in a suction blast cabinet. Two additional cured coats of the slurry were applied to the samples as before and they were again diffusion heat treated at 870° C. (1600° F.) for 2 hours in argon.

Undiffused residues were again blasted off the samples with 320 grit alumina. Again, two more coats of slurry were applied to this clean surface, each coat being sprayed and cured as had been done for the previous four coats. These cured coats of slurry were in turn diffused at 870° C. (1600° F.) in argon for 2 hours. Undiffused residues from this finally diffused coating were then removed by lightly blasting with −140 +270 glass beads at 20 psi maximum in a suction blast cabinet.

Figure 4:
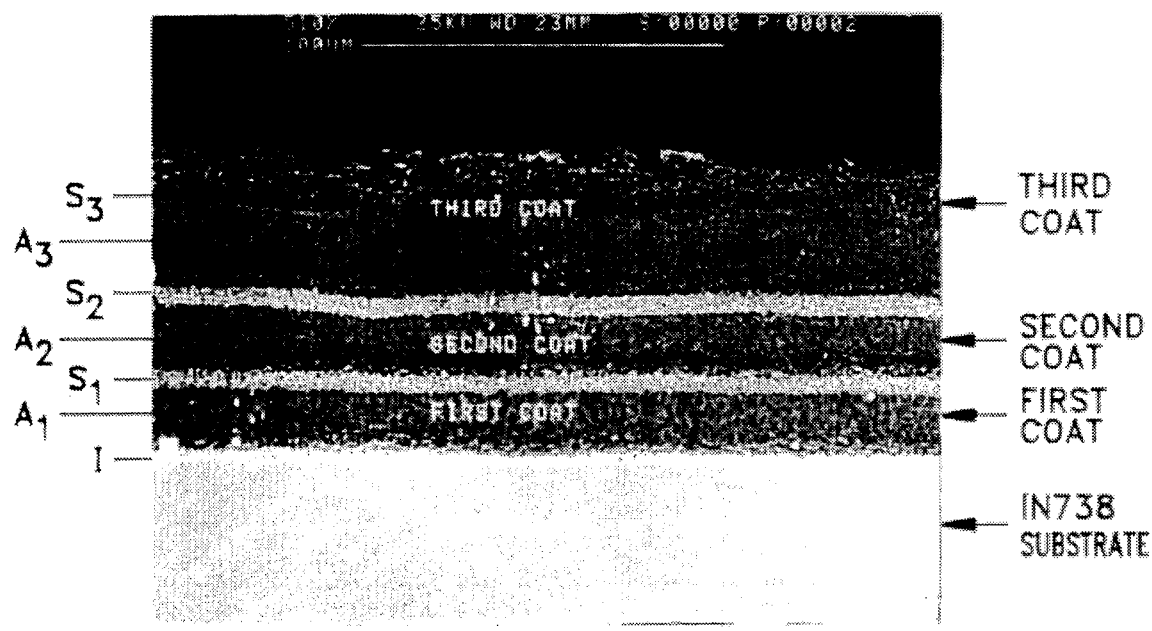
FIG. 4 is a photomicrograph view at 510 X magnification of a cross section through a multi-layer aluminide coating according to the present invention, the coating being on a nickel based superalloy substrate.
Figure 5:
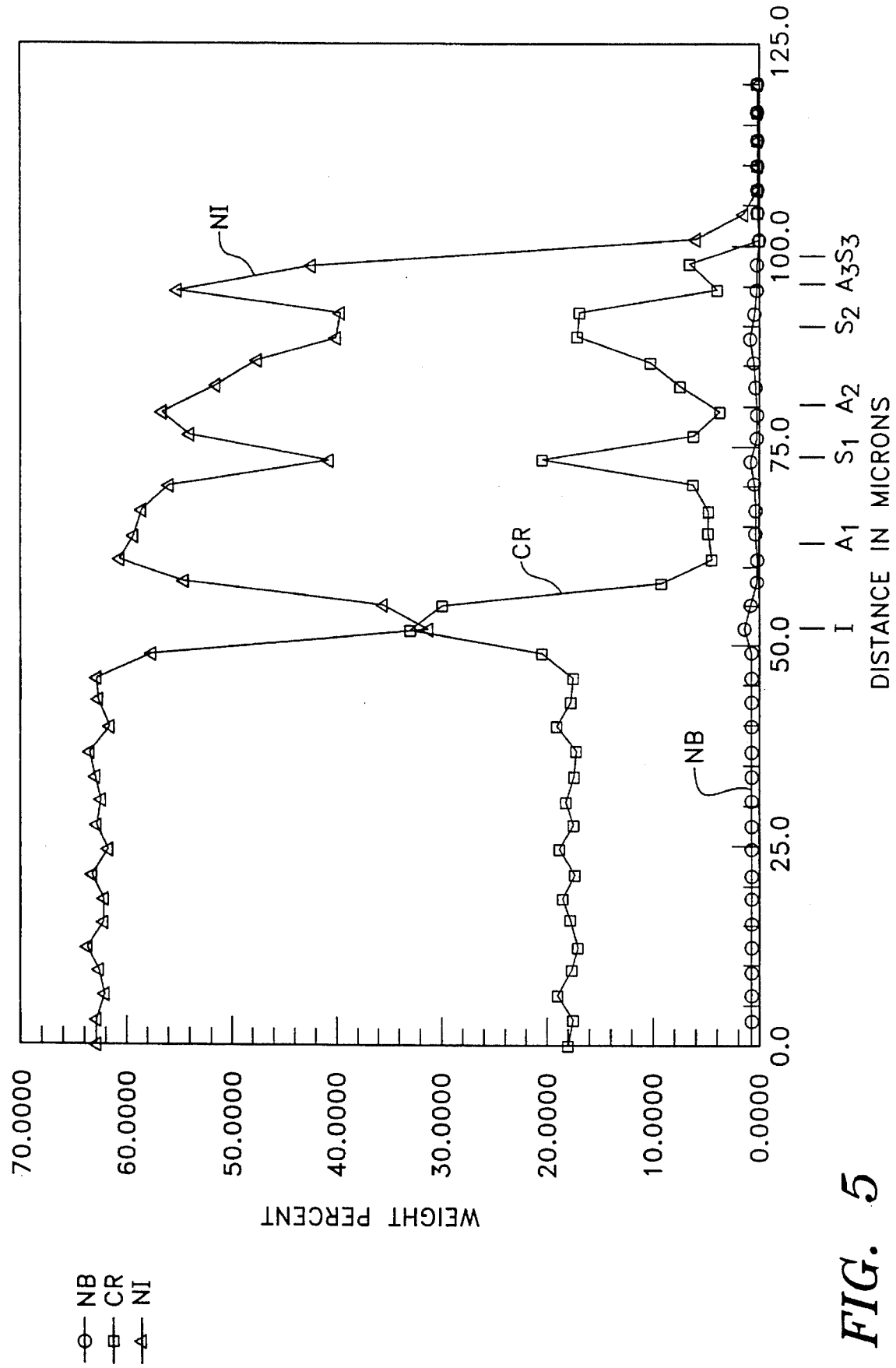
FIGS. 5 to 7 are graphs showing the results of microprobe analysis for the distribution of various protective coating and superalloy substrate elements throughout the multi-layer coating shown in FIG. 4, with weight percentages of the elements being plotted against the distance in microns from a datum situated well within the superalloy substrate.
Figure 6:
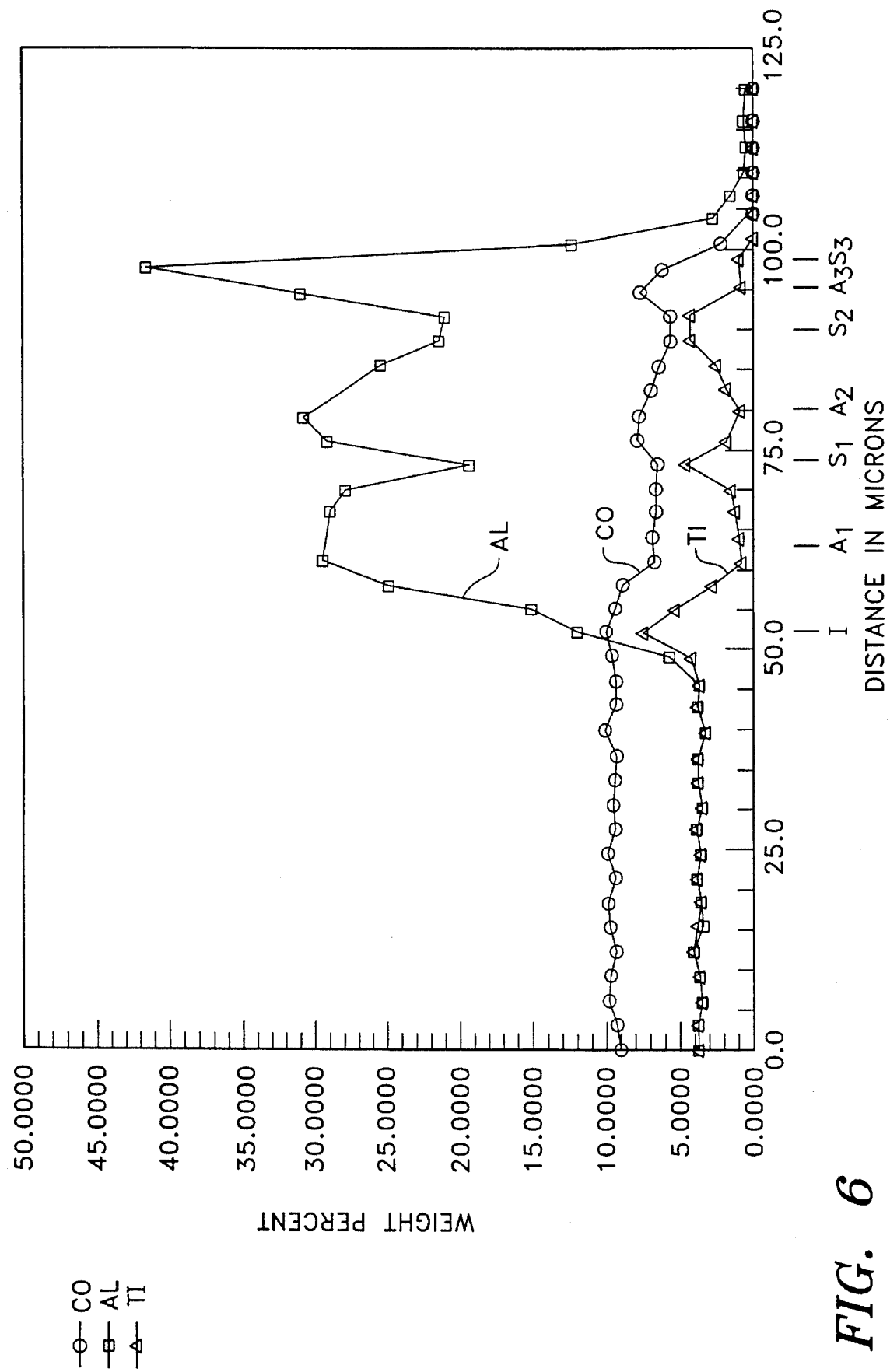
Figure 7:
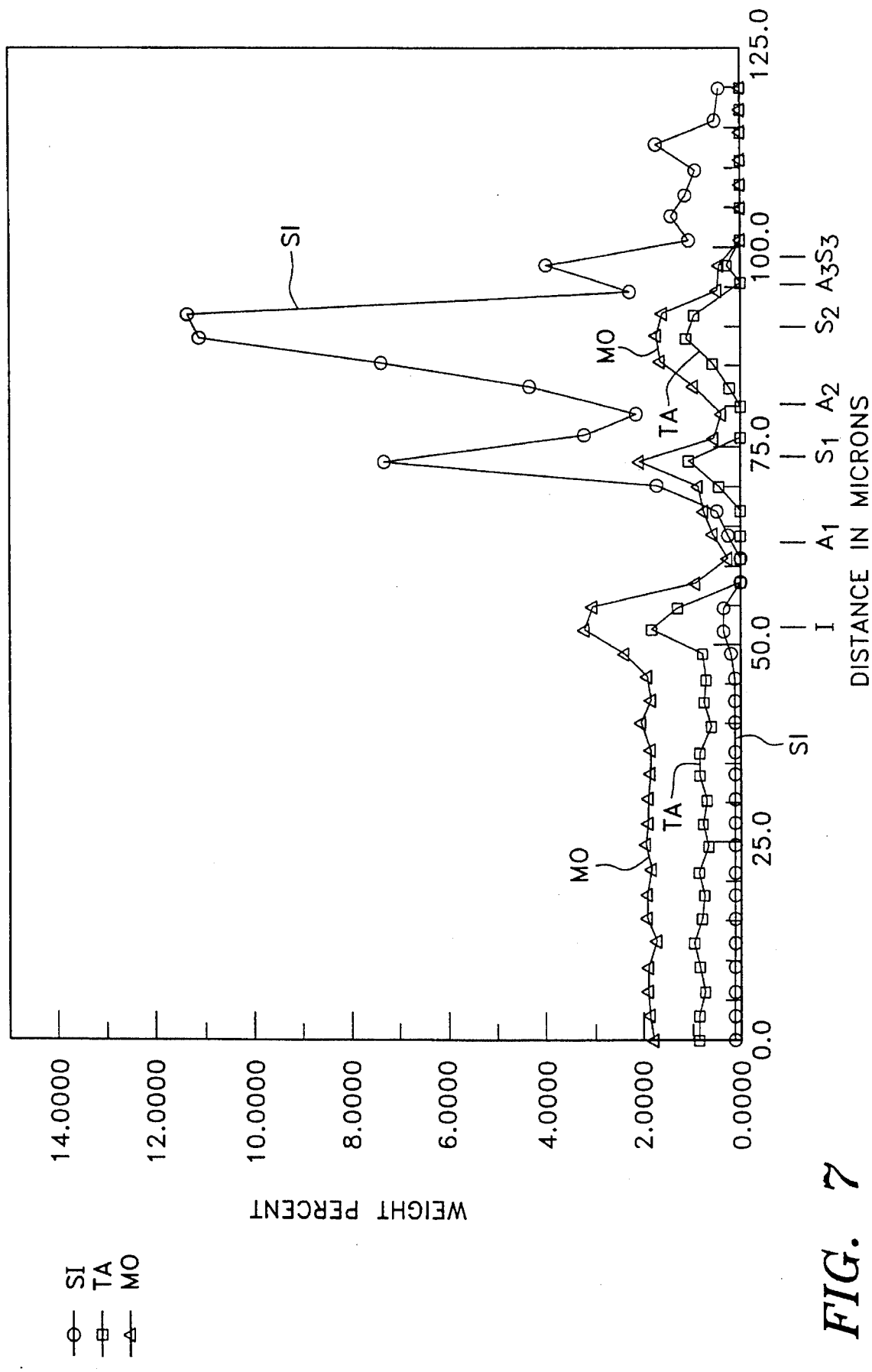

The three layered microstructure of the resulting composite aluminide-silicide coating produced on the turbine blade samples is shown in FIG. 4, the coating having a total depth of about 70 microns. FIGS. 5 to 7 show in graphical form the results of microprobe analysis for the distribution of elements within the coating structure. However, the microprobe results relate to a different part of the blade sample and therefore the dimensions on the horizontal scale of FIGS. 5 to 7 do not correspond exactly with the dimensions seen in FIG. 4, due to unevenness in the thickness of the coating as applied. The analysis is approximate due to the limitations of the measurement process.

A suitable microprobe analyser to use is a Camabax Electron Probe Microanalyser made by Cameca Instruments, having a nominal electron beam diameter of 1 μm. This instrument detects elemental concentrations, whether the elements are combined as compounds or not, so the percentage figures represent a bulk average analysis for a chosen element at the sampling point.

FIGS. 5 and 7 in particular confirm that silicon-rich phases (primarily chromium silicides) are concentrated within three bands in the coating layer and are somewhat differently distributed from the aluminides, see FIG. 6. The elements nickel (Ni), chromium (Cr), niobium (Nb), cobalt (Co), titanium (Ti), tantalum (Ta) and molybdenum (Mo) are present in the coating by virtue of their diffusion from the underlying superalloy, the diffusion interface between the coating and the superalloy being at about 50 microns on the horizontal scale of the graphs.

Table 1 gives approximate data for three other elements found to be present in the coating in small amounts, namely yttrium, tungsten and sulphur. It shows approximate weight percentages of these three elements for measurement stations within the coating, measurement being from the same datum as in FIGS. 5 to 7.

TABLE 1

| | μm | | | | | | | | | |
|---|---|---|---|---|---|---|---|---|---|---|
| | 46.5 | 49 | 52.5 | 56 | 58 | 62 | 65 | 68 | 71 | 74 |
| W wt. % | 2.38 | 2.63 | 4.31 | 4.13 | 1.58 | 0.33 | 0.68 | 1.08 | 1.62 | 2.45 |
| Y wt. % | 0.10 | 0.10 | 0.07 | 0.05 | 0.04 | 0 | 0 | 0 | 0 | 0 |
| S wt. % | 0.05 | 0.06 | 0.08 | 0.08 | 0 | 0 | 0 | 0 | 0 | 0.02 |
| | μm | | | | | | | | | |
| | 77 | 80 | 83 | 86 | 89 | 92.5 | 95.5 | 98 | 102 | |

TABLE 1-continued

| W wt. % | 0.58 | 0.50 | 1.50 | 2.18 | 2.48 | 2.78 | 0.71 | 1.00 | 0 |
| Y wt. % | 0 | 0 | 0 | 0 | 0 | 0 | 0 | 0 | 0 |
| S wt. % | 0 | 0 | 0 | 0 | 0 | 0 | 0 | 0 | 0 |

Looking at FIG. 4 in more detail, and in conjunction with FIGS. 5 to 7, it will be seen that next to the substrate is a narrow light coloured band I. This comprises an intermetallic carbide zone, where Cr, Ti, Ta and Mo are all present in significantly greater concentrations than in the substrate or the adjacent part of the coating, but Ni in a significantly reduced concentration.

Band I is followed by alternating broad dark coloured bands and narrow light coloured bands labelled $A_1, A_2, A_3$ and $S_1, S_2, S_3$, respectively. The light coloured bands have enhanced silicon content relative to the immediately adjacent regions of the coating. $S_3$ is not very well defined visually or in terms of the microprobe analysis, due to the multi-diffusion coating process of the invention reducing the relative concentration of silicon containing (silicide) phases near the surface of the coating. Above band $S_3$ in FIG. 4 there is evident a further and outermost near-surface coating zone, barely indicated in FIGS. 5 to 7, which shows no evidence of any substantial silicide segregation of the type evident in bands $S_1$ and $S_2$, or in the surface layer of a standard SermaLoy J coating (see FIG. 8).

The broad dark bands in FIG. 4 coincide with zones which are particularly rich in aluminium. These contain a maximum of about 30–45 wt. % Al and 55–60 wt. % Ni, the two elements being combined as nickel aluminides. Dark bands $A_1, A_2, A_3$ also exhibit significantly reduced concentrations of Cr and Ti.

The narrow light bands $S_1, S_2, S_3$ comprise silicon rich zones containing a maximum of about 4–11 wt. % Si and 6–19 wt. % Cr combined as chromium silicides. These light bands also have significantly increased concentrations of Ti, Mo and Ta (except for band $S_3$), but significantly reduced concentrations of Al and Ni.

For purposes of comparison with the prior art, pins of identical IN-738 alloy material were given a standard SermaLoy J aluminide coating. The pins were first degreased and grit blasted as before. Four coats of the identical aluminium-silicon slurry used for the multiple diffusion treated samples were then applied to the pins. Each coat was cured at 350° C. (660° F.) for ½ hour after being dried at 80° C. (175° F.) for at least 15 minutes. In total, 22–27 mg/cm of cured slurry was applied to each pin surface. The coated pins were then heated to 870° C. (1600° F.) and held at that temperature for two hours to interdiffuse the coating constituents and the base material. When the parts were cool, undiffused residues were removed by lightly blasting with −140 +220 glass beads at 20 psi (138 kPa) in a suction blaster. The resultant microstructure is shown in FIG. 8.

Figure 8:
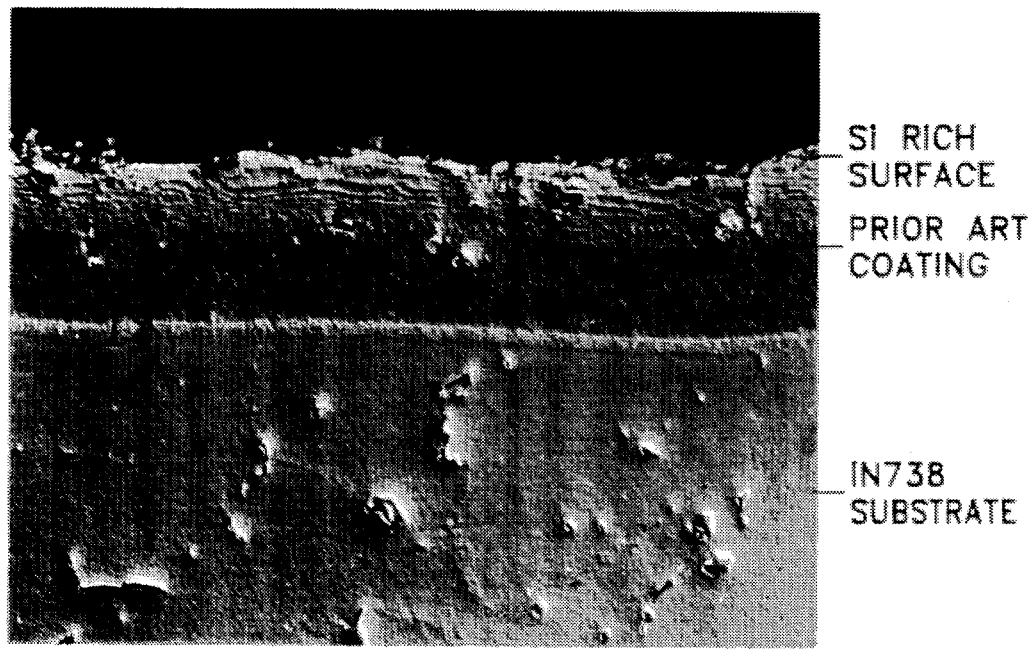
FIG. 8 is a photomicrograph view at 510 X magnification of a cross section through a prior art aluminide-silicide coating, the coating being on a nickel based superalloy substrate.
Figure 9:
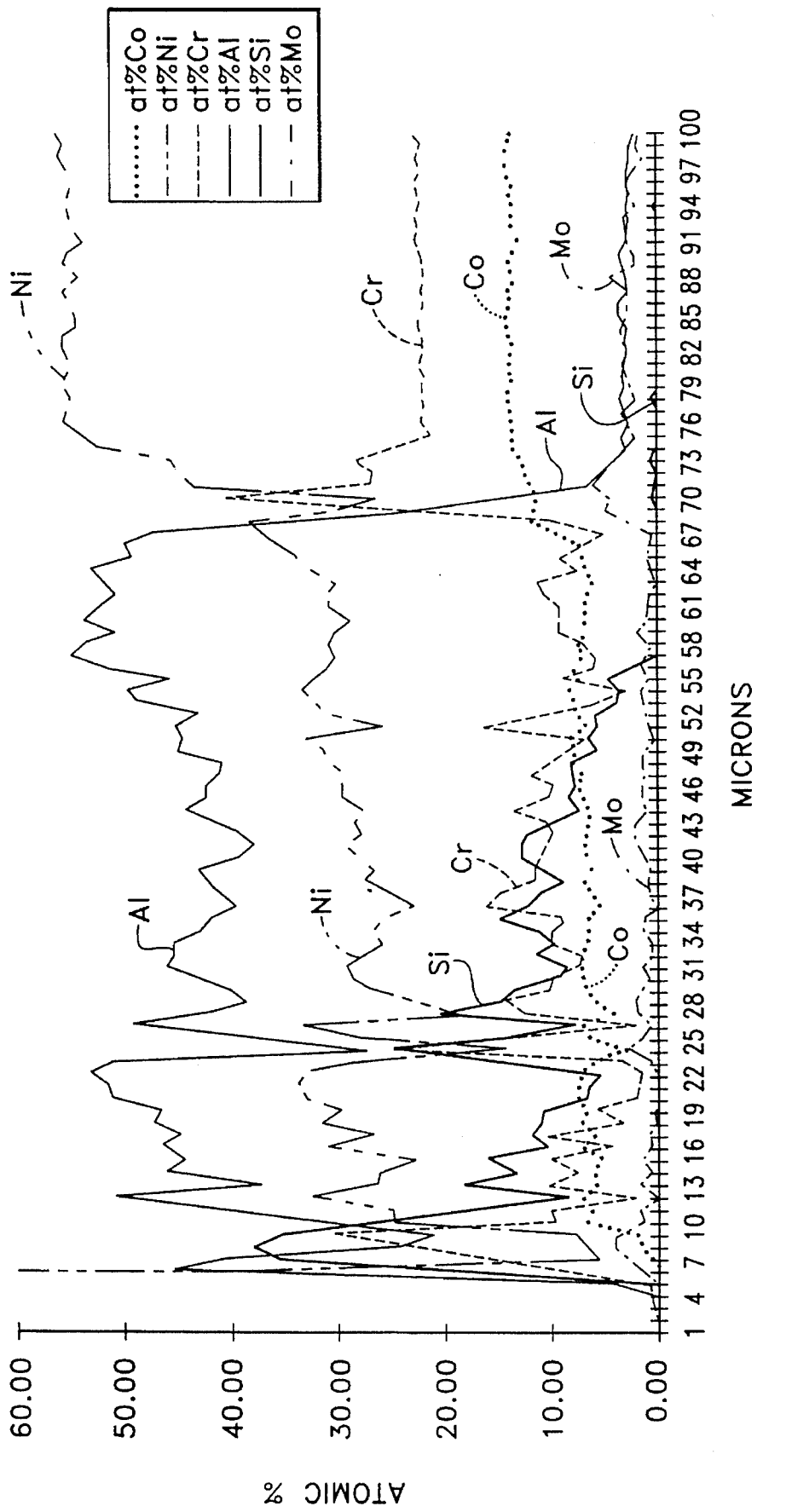
FIGS. 9 and 10 are graphs showing results of a typical microprobe analysis for distribution of various protective coating and superalloy substrate elements throughout a prior art coating and substrate of the type shown in FIG. 8, with atomic percentages of the elements being plotted against the distance in microns from a datum situated at the outermost surface of the coating.
Figure 10:
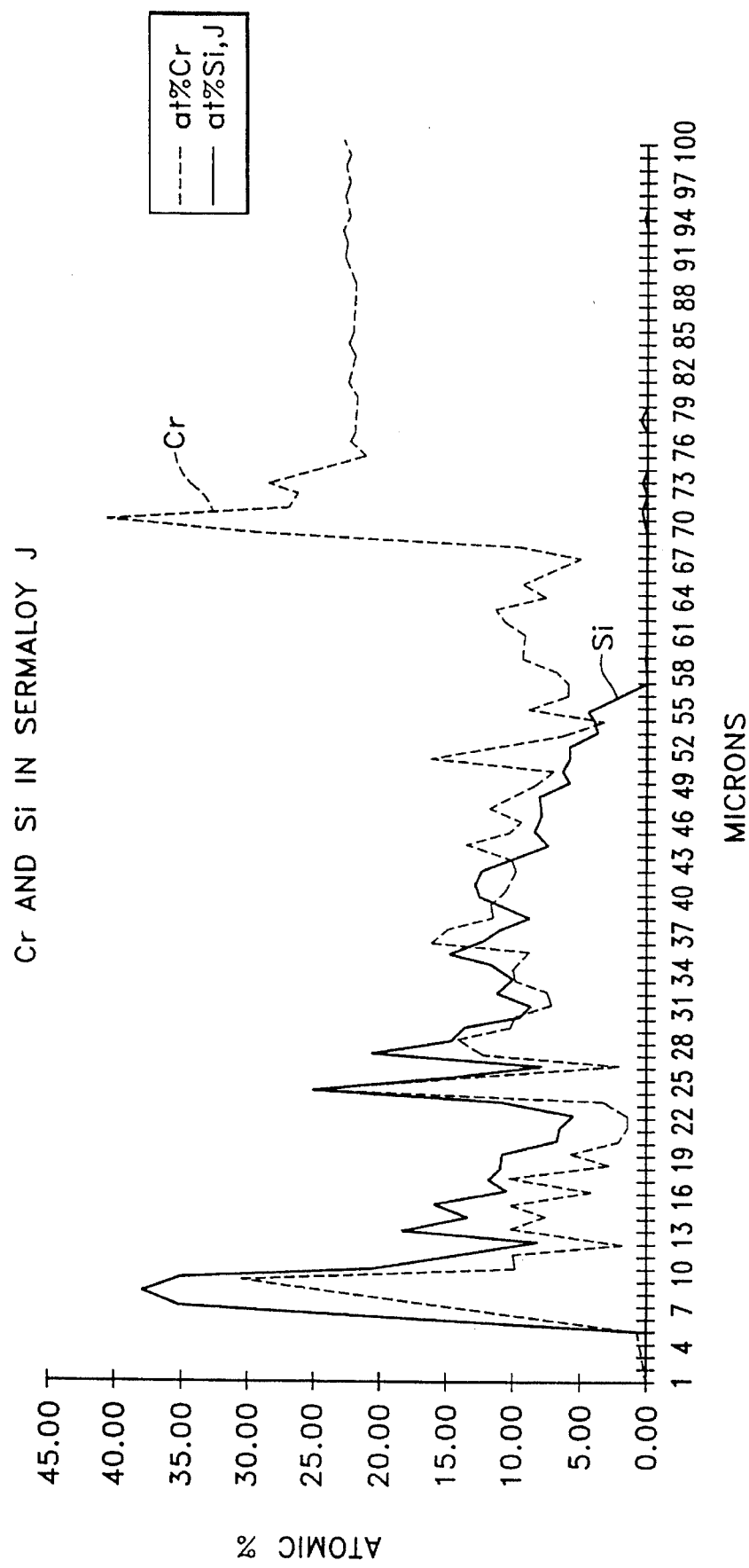

As seen in FIG. 8, the coating cross section exhibits at least three distinct zones, but the features of the coating are somewhat coarser than those seen at similar magnifications in the multiple diffused coating of FIG. 4. Microprobe analysis of a nickel-plated metallurgical sample, as seen in FIGS. 9 and 10, revealed that the standard coating was like the multiple diffused coating in that both are composites of nickel aluminide and silicides, primarily chromium silicides. However, the standard structure differs from the multiple diffused structure in that the greatest concentration of silicon is at the outermost surface of the coating, being as high as 38 atomic % (34 wt. %) silicon at locations within the first 10 microns of the coating surface. By comparison, silicon concentrations nearest the outer surface of the multiple diffusion coating (see band $S_3$ on FIGS. 4 and 7) do not exceed a silicon content of 4 wt. % (equivalent to 5.37 atomic %). This illustrates that the multiple diffused coating of the invention has a significantly reduced silicon content in its surface layer compared with the single diffused coating of the prior art. The lower silicide concentrations near the outer surface of the coating reduce brittleness and improve durability. It is believed that silicon concentrations of about 8–10 wt. % in or near the outer surface of the coating would be acceptable from the point of view of reducing propensity to cracking compared to the prior art coating.

For assessment of hot corrosion resistance, rig testing of the pin samples was undertaken. A pin sample given three successive coats of "SermaLoy J" with intermediate heat treatments as described above was tested against another pin sample coated in the standard "SermaLoy J" manner.

In the test, pins were heated for three minutes in an open flame fuelled by propane, achieving a steady state temperature of 950° C.(1740° F.) within about 60 seconds. Then the hot pins were quenched to room temperature within 60 seconds in a fine atomised spray of an aqueous solution containing 1 wt. % $Na_2SO_4$ and 10 wt. % NaCl. After three minutes in the spray, the complete heating and quenching cycle was repeated and this was continued for a total of about 140 hours. About every seven hours the test was interrupted and the pins were removed, ultrasonically cleaned in de-ionised water, weighed and examined by eye.

The results of this test are illustrated in FIG. 8 and show that initially the rate of attrition of the multi-layer multi-diffused coating was slightly more than that on standard SermaLoy J, but that from about 20 hours to about 120 hours into the test the attrition rates were about the same. Towards the end of the test the rate of weight loss of the pin coated with standard SermaLoy J suddenly became much greater, whereas the loss rate for the multi-diffused coating continued at a substantially constant value. In fact, at the end of the test, it was found that the pin coated in accordance with the present invention still had a continuous coating, whereas the pin with the standard SermaLoy J coating had suffered coating failure to the extent of exposing the substrate.

The above test indicated that the outer silicon rich layer of standard SermaLoy J coatings was giving good initial hot corrosion protection, but that once this silicon rich layer was breached, the attack accelerated. On the other hand, the coating according to the present invention did not have a significant silicon rich outer layer, therefore the rate of hot corrosion was initially higher until it penetrated to the middle coat which was applied second in the process sequence, where the silicon rich layer slowed down the attack. The rate of attack was consequently much slower in the middle layer than in the top layer. In the event that the middle layer had become exhausted, the fresh silicon-rich layer present in the lower layer should have resulted in even more greatly reduced attack rates relative to the standard coating.

To confirm the above results, a 2000 hour endurance test was performed on a Rolls-Royce SM1A test engine which incorporated some of the turbine blade samples mentioned previously, plus normally coated blades. The testing included many cycles between idle and full power conditions on a variety of different schedules, one three hour shutdown each day for cleaning and routine maintenance, and one five minute shutdown each day to provide the conditions for a relight with a hot engine. Fuel was Dieso F-76. To simulate a corrosive marine environment, salt was injected into the intake of the engine after after 561 hours for the remainder of the test at a rate of 0.01 weight parts per million of NaCl in air.

At the end of the test the blades were subject to microscopic inspection. It was found that the blades coated with standard SermaLoy J exhibited cracks in their coatings and that some showed total penetration of the coating with corrosion of the substrate. However, the blades coated in accordance with the invention had no visible cracks and nowhere were the coatings totally penetrated.

This confirms that the coating of this invention possesses increased corrosion resistance and better resistance to cracking than aluminium-silicon slurry aluminide coatings cured and diffused only once before use.

(B) COATINGS ON COBALT BASED SUPERALLOY SUBSTRATE

Whereas the above examples and discussion have emphasised the suitability of the invention in respect of coatings for nickel-based superalloys, the invention is also believed applicable to cobalt-based superalloys.

Consequently, the method of the invention was also applied to produce silicon modified aluminide coatings on a turbine blade aerofoil segment made of X-40 cobalt base superalloy material.

The nominal composition of X-40 in wt. % is as follows:

Ni—10.5
Cr—25.5
Co—54
W—7.5
Si—0.75
Mn—0.75
C—0.5

The aerofoil was degreased and grit blasted as previously described and two coats of the slurry of aluminium and silicon powders used in Example A were applied to the blasted parts, each coat being cured at 350° C. (660° F.) for 30 minutes. The coated aerofoil was heated in a vacuum to 870° C. (1600° F.) and held at that temperature for half an hour, before being heated to 1000° C. (1835° F.) and held at the higher temperature for two hours. After cooling, undiffused residues were removed by blasting with 90/120 grit alumina at 8 psi (55 kPa) in a pressure blast cabinet. Two more coats of slurry were applied to the sample and diffusion heat treated as before. Subsequently, undiffused residues were removed once more by grit blasting, two more coats of slurry applied, and the part diffused a third time as before. Undiffused residues from the final diffusion step were removed by lightly blasting with −140 +270 glass beads at 20 psi (138 kPa) in a suction blast cabinet.

For comparison, a cylindrical pin of X-40 alloy was grit blasted as above and sprayed with four coats of the same slurry, each coat being cured in the normal way before further processing. The pin finally had 22–27 mg of cured aluminium-silicon slurry per square centimeter of its surface. It was then heat treated for diffusion of the coating with the substrate using the same heating sequence as was used for the aerofoil segment. Undiffused residues were removed by lightly burnishing with glass beads. The aluminide-silicide coating produced on this pin represented the standard SermaLoy J coating as used on industrial turbines, which has demonstrated excellent resistance to hot corrosion when used on this cobalt-based alloy in laboratory and engine tests.

Figure 12:
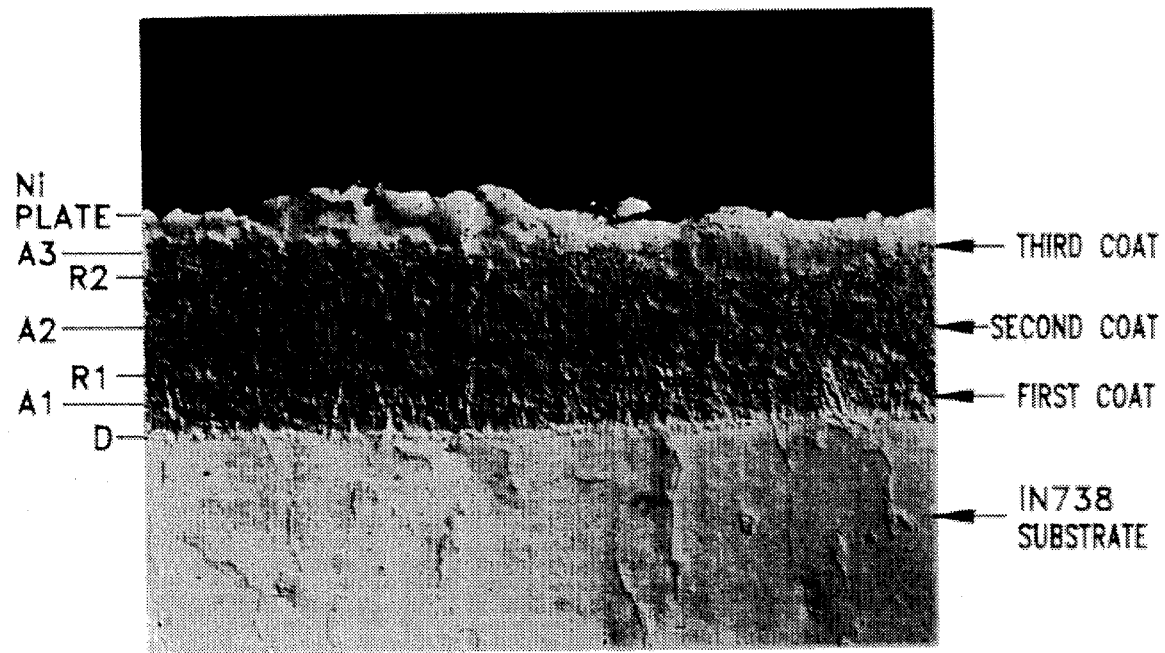
FIG. 12 is a photomicrograph view at 375 X magnification of a cross section through an aluminide-silicide coating according to the present invention, the coating being on a cobalt based superalloy substrate.
Figure 13:
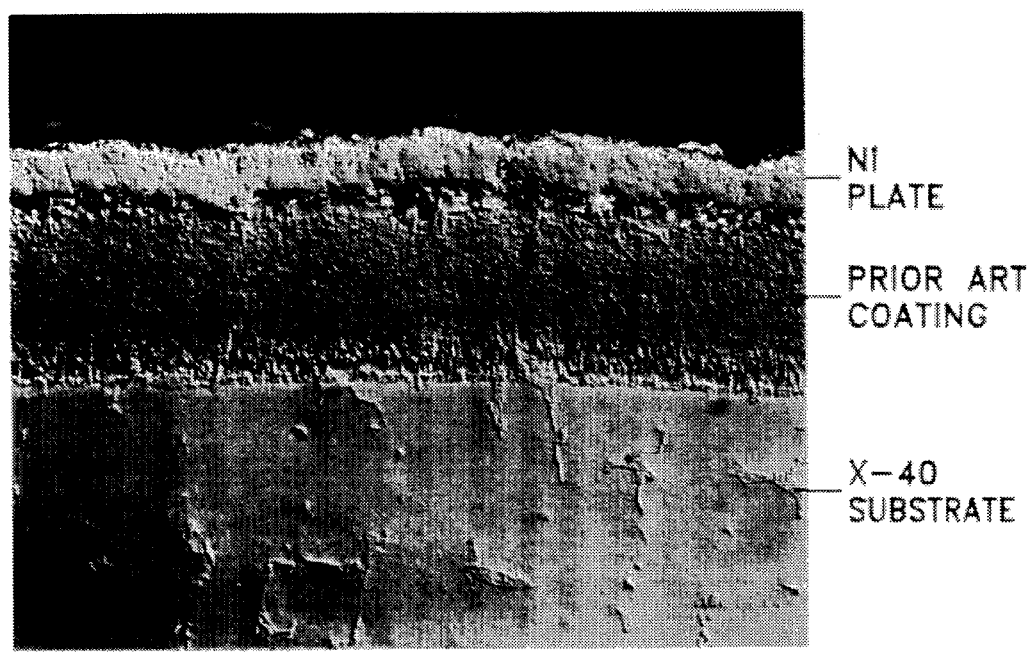
FIG. 13 is a photomicrograph view at 375 X magnification of a cross section through a prior art aluminide-silicide coating, the coating being on a cobalt based alloy substrate.

When the aerofoil segment and the pin were sectioned and examined microscopically, it was found that the aerofoil coating produced by multiple diffusions at 1000° C. exhibited the three-layered structure shown in FIG. 12, but the standard coating on the pin, shown in FIG. 13, did not exhibit such pronounced stratification. Although differential interference contrast has been used in FIGS. 12 and 13 to highlight the microstructures, the different characteristics are better appreciated from a comparison of FIGS. 14 and 15, where contrast has been enhanced by utilising dark field illumination to produce images of the aerofoil and pin coating sections respectively. In looking at FIGS. 12 to 15, it should be particularly noted that the topmost layer in each of these Figures is not part of the diffused aluminide coating, but is nickel, which was later electroplated onto the sample to aid metallography.

Figure 14:
FIGS. 14 and 15 are photomicrograph views at 375 X magnification of the cross sections shown in FIGS. 12 and 13 respectively, but using dark field illumination to enhance contrast.
Figure 15:
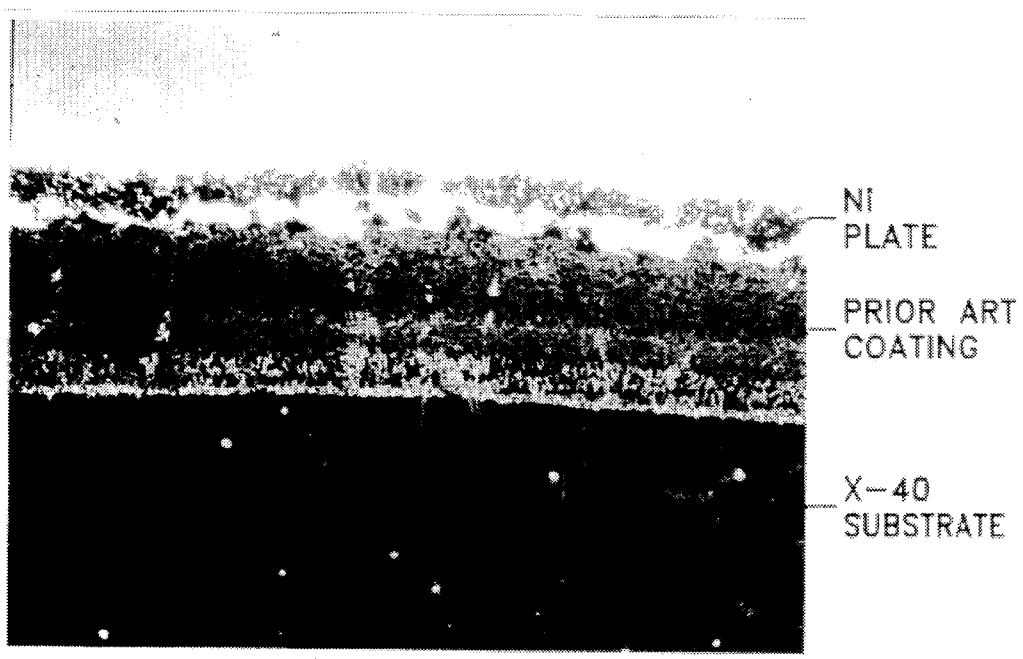

From FIGS. 13 and 15, it is apparent that the structure of the coating produced on the pin consists of fine precipitates (primarily silicides) widely distributed throughout the cobalt aluminide matrix. On the other hand, FIGS. 12 and 14 show coarser precipitates concentrated in two, perhaps three bands in the coating due to the successive diffusion steps of the present invention.

A section was taken through the aerofoil for microanalysis using a scanning electron microscope with electron dispersion X-ray analysis equipment attached. Results of the microanalysis are shown in Table 2 below.

TABLE 2

| Distance from Surface μm | Element Concentration (Weight %) | | | | | |
|---|---|---|---|---|---|---|
| | Co | Al | Ni | Si | Cr | W |
| 6 | 41.5 | 41.6 | 6.7 | 2.4 | 5.9 | 0.5 |
| 13 | 33.6 | 50.3 | 2.5 | 2.0 | 9.0 | 1.6 |
| 21 | 18.5 | 18.6 | 4.1 | 13.2 | 33.1 | 12.2 |
| 29 | 40.5 | 29.0 | 8.9 | 5.2 | 13.2 | 2.5 |
| 40 | 43.2 | 30.6 | 9.3 | 4.8 | 10.2 | 1.2 |
| 51 | 34.3 | 27.5 | 7.2 | 6.5 | 19.1 | 4.7 |
| 63 | 38.6 | 26.4 | 8.0 | 2.9 | 18.9 | 4.5 |
| 73 | 40.0 | 2.5 | 7.4 | 2.8 | 34.5 | 12.5 |
| 90 (Substrate) | 52.5 | 0.35 | 11.1 | 0.3 | 27.4 | 7.6 |

The analysis revealed that the outermost layer A3 of the coating is mostly cobalt aluminide, see FIGS. 12 and 14, containing very little silicon. Below the outermost layer A3 is a thin refractory zone R2 of blocky precipitates, approximately 5 microns in width, containing high levels of chromium, silicon and tungsten. Under zone R2 is a second (and thickest) aluminide layer A2. This layer has a lower aluminium content than the outermost layer A1, but is quite uniform in structure, with a thickness of about microns. Below layer A2 is another thin refractory zone R1 containing intermetallic and refractory compounds high in chromium, silicon and tungsten. An innermost aluminide layer A1 is approximately 20 microns in thickness. Its aluminium content is lower than the outermost layer, but comparable to that in the intermediate layer of the coating. Finally, a thin diffusion zone D (better seen in FIG. 12) is seen at the interface of the coating and the substrate.

Whereas the above-described embodiments of the invention have focused on multiplex aluminide-silicide coatings possessing a composite microstructure having three diffusion heat treated coats or layers, it will be evident to the skilled worker that such a coating might alternatively comprise only two diffused coats, or more than three. However, it is believed that three is probably the optimum number.

Although it is preferred to use two thin wet slurry coats, individually cured, to build up a satisfactory thickness of cured coating on the substrate before each diffusion treatment, it could alternatively be possible to use a single thicker, more viscous, slurry coat instead, then cure and diffusion treat the resulting coating before repeating the steps. However, it is not believed that this is the optimum method. Furthermore, it would also be possible to use more than two thin low viscosity individually cured slurry coats to build up coating thickness before each diffusion step, but again, this is not thought to be optimum.

It is within the scope of the invention for the silicon-enriched bands not to differ from each other with respect to their silicon content. In a coating having a multiplicity of spaced apart bands with enhanced silicon content relative to the neighbouring regions of the coating, two or more of the bands may have the same or substantially the same silicon content. This aspect of the invention can be achieved by varying the silicon content of the slurries, and/or varying the diffusion conditions, from one diffusion step to the other.

We claim:

1. An article comprising a superalloy substrate having thereon a corrosion-resistant multiplex aluminide-silicide coating, in which elements corresponding to constituent elements of the superalloy substrate are present throughout the extent of the coating but are combined differentially with aluminum and silicon constituents of the coating, said coating having an interface with the substrate, an outer surface and a composite microstructure such that a plurality of depthwise spaced apart bands having different compositions with respect to their aluminide and silicide contents are formed, there being at least two of said bands whose silicide contents are greater than or enhanced with respect to immediately adjacent bands of the coating, the one of said at least two bands having the lowest silicide contents being located farthest from the substrate surface.

2. The article of claim 1, wherein the substrate is a nickel-based superalloy.

3. The article of claim 1, wherein the substrate is a cobalt-based superalloy.

4. The article of claim 1, wherein the silicon content in and near the surface of the coating does not exceed 10 wt. %

5. The article of claim 1, wherein amongst the plurality of bands, two or more bands have substantially the same silicon content.

6. The article according to claim 1 in which said bands are not coincident with an outer surface of the coating.

7. The article according to claim 1, the coating having two bands with enhanced silicon content, the outermost band being located within the coating at a distance of about 20 µm from its outer surface.

8. The article according to claim 1, the coating having three bands with enhanced silicon content, the bands differing from each other with respect to silicon content, the outermost band being also the band exhibiting the least silicon content of the three bands.

9. An article comprising a superalloy substrate having thereon a corrosion-resistant multiplex aluminide-silicide coating, which substrate contains aluminide and silicide forming metallic elements as major constituents, the coating having an interface with the substrate, an outer surface and a composite microstructure including a plurality of depthwise spaced apart bands having different compositions with respect to their aluminide and silicide contents, there being at least two of said bands whose silicide contents are greater than or enhanced with respect to immediately adjacent bands of the coating, the one of said at least two bands having the lowest silicide contents being located farthest from the substrate surface.

10. A coating according to claim 9 in which said bands having silicide contents greater than immediately adjacent bands are not coincident with an outer surface of the coating.

11. The article according to claim 9, the coating having two bands with enhanced silicon content, the outermost band being located within the coating at a distance of about 20 µm from its outer surface.

12. The article according to claim 2, the coating having three bands with enhanced silicon content, the bands differing from each other with respect to silicon content, the outermost band being also the band exhibiting the least silicon content of the three bands.

13. The article according to claim 9 in which the silicon content in and near the surface of the coating does not exceed 10 wt. %

14. The article according to claim 13, in which the silicon content in and near the surface does not exceed 8 wt. %.

15. The article of claim 2 wherein the substrate is a nickel-based of a cobalt based superalloy substrate.

16. The article of claim 15 wherein the substrate is a nickel-based superalloy substrate.

17. The article of claim 15 wherein the substrate is a cobalt-based superalloy substrate.

18. An article comprising a superalloy substrate having thereon a corrosion-resistant multiplex aluminide-silicide coating, said substrate containing aluminide and silicide forming metallic elements as major constituents, the coating having an interface with the substrate, an outer surface and a composite microstructure including a plurality of depthwise spaced apart bands having different compositions with respect to their aluminide and silicide contents, there being at least two of said bands whose silicide contents are greater than immediately adjacent bands of the coating, one of said at least two bands having a greatest silicide content, said band with greatest silicide content being spaced away from the outer surface of the coating.

19. The article according to claim 18, the substrate being a nickel-based superalloy containing chromium as the major silicide forming element.

20. The article according to claim 18, the substrate being a cobalt-based superalloy containing chromium as the major silicide forming element.

21. A process for producing a corrosion-resistant multiplex aluminide-silicide coating on a suitable superalloy substrate, comprising the steps of applying to the superalloy substrate at least one layer of a coating material comprising aluminium and silicon, diffusion heat treating the at least one layer, and repeating the above application and diffusion steps at least once more to produce a finished coating having a plurality of bands of silicon rich phases and a plurality of bands of aluminum rich phases, said bands being spaces apart alternately through the thickness of the finished coating.

22. A process according to claim 21 in which the application and diffusion process steps are repeated twice.

23. A process according to claim 22, the coating material containing elemental powders of aluminum and silicon.

24. A process according to claim 22, the coating material containing pre-alloyed powders of aluminum and silicon.

25. A process according to claim 22, the coating material comprising between 2 and 40% silicon by weight of total solid content.

26. A process according to claim 22, the coating material comprising between 5 and 20% silicon by weight of total solid content.

27. A process according to claim 22, the coating material comprising between 10 and 15% silicon by weight of total solid content.

28. The article produced by the process of claim 22.

29. A process according to claim 21, the coating material containing elemental powders of aluminium and silicon.

30. A process according to claim 21, the coating material containing pre-alloyed powders of aluminium and silicon.

31. The article produced by the process of claim 30.

32. A process according t claim 21, the coating material comprising between 2 and 40% silicon by weight of total solid content.

33. The article produced by the process of claim 32.

34. A process according to claim 21, the coating material comprising between 5 and 20% silicon by weight of total solid content.

35. A process according to claim 21, the coating material comprising between 10 and 15% silicon by weight of total solid content.

36. A process for producing a corrosion-resistant multiplex an aluminide-silicide coating on a superalloy substrate containing aluminide and silicide forming metallic elements as major constituents, comprising the steps of depositing a coat of slurry coating material on the substrate, the coating material comprising silicon and aluminium in powder form and a curable binder liquid, heating the coated article to a temperature below the melting temperature of aluminium for a time sufficient to cure the coat, repeating the depositing and heating steps, diffusion heat treating the coated article in a protective inert atmosphere at a temperature above the melting temperature of aluminium for a time sufficient to diffuse aluminium and silicon from the coating material into the alloy article and at least chromium and nickel from the alloy article into the coating material, and repeating all the preceding steps at least once to produce a finished coating having a plurality of bands of silicon rich phases and a plurality of bands of aluminium rich phases, said bands being spaced apart through the thickness of the finished coating.

37. A process according to claim 36, the coating material containing elemental powders of aluminum and silicon.

38. A process according to claim 36, the coating material containing pre-alloyed powders of aluminum and silicon.

39. A process according to claim 36, the coating material comprising between 2 and 40% silicon by weight of total solid content.

40. A process according to claim 36, the coating material comprising between 5 and 20% silicon by weight of total solid content.

41. A process according to claim 36, the coating material comprising between 10 and 15% silicon by weight of total solid content.

42. The article produced by the process of claim 36.

43. A process for producing a corrosion-resistant multiplex an aluminide-silicide coating on a superalloy substrate containing aluminide and silicide forming metallic elements as major constituents, the coating material comprising silicon and aluminium in powdered form and a curable binder liquid, heating the coated article to a temperature below the melting temperature of aluminium for a time sufficient to cure the coat, diffusion heat treating the coated article in a protective inert atmosphere at a temperature above the melting temperature of aluminium for a time sufficient to diffuse aluminium and silicon from the coating material into the alloy article and at least chromium and nickel from the alloy article into the coating material, and repeating the depositing, heat curing and heat treating steps at least once more to produce a finished coating having a plurality of bands of silicon rich phases and a plurality of bands of aluminium rich phases, said bands being spaced apart through the thickness of the finished coating.

44. A process according to claim 43, the coating material containing elemental powders of aluminum and silicon.

45. A process according to claim 43, the coating material containing pre-alloyed powders of aluminum and silicon.

46. A process according to claim 43, the coating material comprising between 2 and 40% silicon by weight of total solid content.

47. A process according to claim 43, the coating material comprising between 5 and 20% silicon by weight of total solid content.

48. A process according to claim 43, the coating material comprising between 10 and 15% silicon by weight of total solid content.

49. The article produced by the process of claim 43.

* * * * *